United States Patent
Cho et al.

(10) Patent No.: US 10,362,294 B2
(45) Date of Patent: Jul. 23, 2019

(54) 3D CAMERA AND METHOD OF MEASURING TRANSMITTANCE USING THE SAME

(71) Applicant: SAMSUNG ELECTRONICS CO., LTD., Suwon-si (KR)

(72) Inventors: Yongchul Cho, Suwon-si (KR); Myungjae Jeon, Yongin-si (KR); Yonghwa Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 315 days.

(21) Appl. No.: 15/096,783

(22) Filed: Apr. 12, 2016

(65) Prior Publication Data

US 2017/0118455 A1    Apr. 27, 2017

(30) Foreign Application Priority Data

Oct. 22, 2015  (KR) .................... 10-2015-0147538

(51) Int. Cl.
| | |
|---|---|
| *G01J 3/00* | (2006.01) |
| *H04N 13/254* | (2018.01) |
| *G01S 17/36* | (2006.01) |
| *G01S 17/89* | (2006.01) |
| *G01S 7/481* | (2006.01) |
| *G01S 7/497* | (2006.01) |

(Continued)

(52) U.S. Cl.
CPC .............. *H04N 13/254* (2018.05); *G01J 3/00* (2013.01); *G01S 7/4814* (2013.01); *G01S 7/4816* (2013.01); *G01S 7/497* (2013.01); *G01S 17/36* (2013.01); *G01S 17/89* (2013.01); *G02F 1/015* (2013.01); *G02F 1/03* (2013.01)

(58) Field of Classification Search
CPC ........................................................ G01S 17/36
See application file for complete search history.

(56) References Cited

U.S. PATENT DOCUMENTS

| | | | |
|---|---|---|---|
| 7,603,041 | B2 | 10/2009 | Varshneya et al. |
| 8,027,591 | B2 | 9/2011 | Maryfield |

(Continued)

FOREIGN PATENT DOCUMENTS

| | | |
|---|---|---|
| JP | 2009-147149 A | 7/2009 |
| KR | 10-2015-0066968 A | 6/2015 |
| WO | WO-9853733 A1 * 12/1998 ......... A61B 5/14532 |

OTHER PUBLICATIONS

Rabinovich, et al.; "45-Mbit/s Cat's-Eye Modulating Retroreflectors", Optical Engineering, vol. 46, No. 10, Oct. 2007, 8 pages total.

*Primary Examiner* — Jayanti K Patel
*Assistant Examiner* — Shadan E Haghani
(74) *Attorney, Agent, or Firm* — Sughrue Mion, PLLC

(57) ABSTRACT

Provided are a three-dimensional (3D) camera including a wavelength-variable light source for directly measuring transmittance and a method of measuring the transmittance. The 3D camera includes, as well as a light source, a transmission type shutter, and an image sensor, and a wavelength-variable light source capable of irradiating a light with a variable wavelength without being thermally affected by the light source, the image sensor, and the transmission type shutter. The wavelength-variable light source may directly measure a change in transmittance by irradiating light toward the transmission type shutter while the 3D camera operates.

21 Claims, 18 Drawing Sheets

(51) Int. Cl.
  *G02F 1/015* (2006.01)
  *G02F 1/03* (2006.01)

(56) References Cited

U.S. PATENT DOCUMENTS

| | | | |
|---|---|---|---|
| 8,681,321 | B2 | 3/2014 | Pelman et al. |
| 8,958,448 | B2 | 2/2015 | Canumalla et al. |
| 9,853,733 | B2* | 12/2017 | Stiffler ............. H04B 10/25759 |
| 2006/0102851 | A1* | 5/2006 | Jalink .................... B07C 5/342 |
| | | | 250/461.2 |
| 2009/0154506 | A1 | 6/2009 | Koyama et al. |
| 2011/0292406 | A1* | 12/2011 | Hollenbeck ........ G01B 11/2518 |
| | | | 356/607 |
| 2012/0300040 | A1 | 11/2012 | McEldowney |
| 2014/0125990 | A1* | 5/2014 | Hinderling ............. G02B 5/284 |
| | | | 356/496 |
| 2015/0109414 | A1 | 4/2015 | Adam et al. |
| 2015/0160480 | A1 | 6/2015 | Lee et al. |
| 2015/0181099 | A1 | 6/2015 | Van Der Tempel et al. |
| 2016/0004920 | A1* | 1/2016 | Armstrong-Crews ....................... |
| | | | G03B 35/00 |
| | | | 348/46 |
| 2016/0033360 | A1* | 2/2016 | Taverner ............ G01D 5/35387 |
| | | | 356/73.1 |
| 2016/0334339 | A1* | 11/2016 | Dasgupta .............. G01N 21/783 |
| 2016/0370174 | A1* | 12/2016 | Bonino .............. G01B 11/0683 |

\* cited by examiner

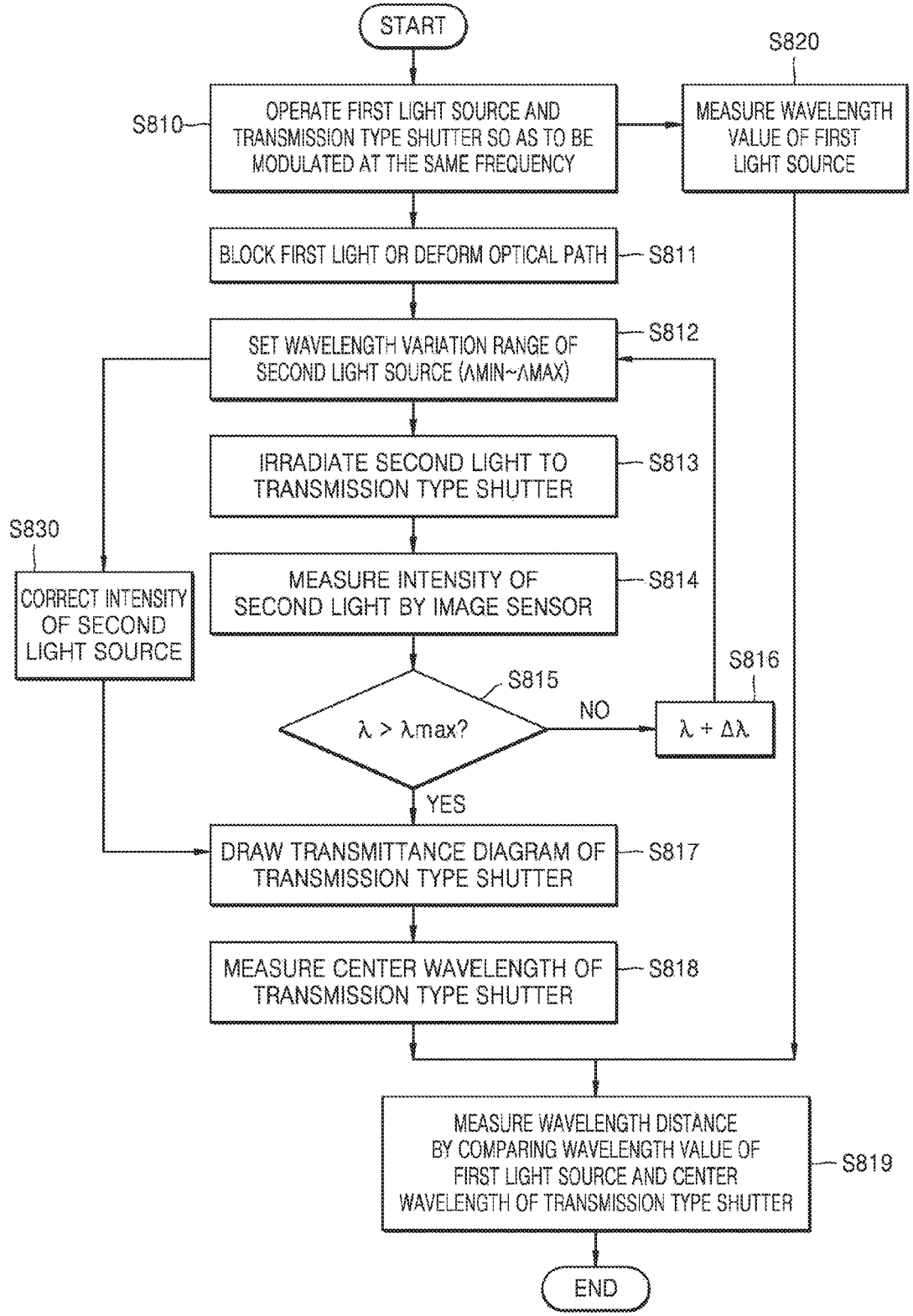

3D CAMERA AND METHOD OF
MEASURING TRANSMITTANCE USING THE
SAME

CROSS-REFERENCE TO RELATED
APPLICATION

This application claims priority to Korean Patent Application No. 10-2015-0147538, filed on Oct. 22, 2015, in the Korean Intellectual Property Office, the disclosure of which is incorporated herein in its entirety by reference.

BACKGROUND

1. Field

The exemplary embodiments disclosed herein relate to three-dimensional (3D) cameras including a wavelength-variable light source and methods of measuring transmittance using the same.

2. Description of the Related Art

In addition to a general function of photographing images, a 3D camera has a function of measuring distances from a plurality of dots on an object surface to the 3D camera. Various algorithms for measuring a distance between an object and a 3D camera, such as a time-of-flight (TOF) method, have been used. In the TOF method, a flight time of an illumination light emitted toward an object, reflected from the object, and received at a light receiving unit is measured. The flight time of the illumination light may be obtained by measuring a phase delay of the illumination light, i.e., a phase difference between light emitted to a subject and light reflected from the subject. A high-speed optical modulator may be used to accurately measure the phase delay.

A transmission type shutter having superior electricity-optical response characteristics has been used in order to obtain a 3D image with high distance precision. Recently, a transmission type shutter having a PIN diode structure has been used. The transmission type shutter is used to correct an effect of temperature on transmittance since a transmittance spectrum may vary with temperature as well as an applied voltage. Recently, a method of estimating a transmittance spectrum by measuring the internal temperature of a 3D camera, which is an indirect method, has been used as a transmittance correction method. However, according to the above method, it is impossible to directly measure the internal temperature of a transmission type shutter and errors may occur while estimating transmittance via the internal temperature.

SUMMARY

Exemplary embodiments disclosed herein may provide three-dimensional (3D) cameras which include a wavelength-variable light source and which are capable of directly measuring transmittance and methods of measuring transmittance using the same.

According to an aspect of an exemplary embodiment, there is provided a three-dimensional (3D) camera including: a first light source configured to emit first light toward an object, the first light being reflected from the object; a transmission type shutter configured to modulate the reflected first light reflected to generate modulated light; an image sensor configured to sense the modulated light that passes through the transmission type shutter; and a second light source that is spaced apart from the first light source, the image sensor, and the transmission type shutter in order to be thermally unaffected by the first light source, the image sensor, and the transmission type shutter, and is configured to emit second light toward the object, and to vary a wavelength of the second light, the varied wavelength of the second light being used by the 3D camera to measure transmittance of the transmission type shutter.

The 3D camera may further include a light blocker provided between the first light source and the object and configured to block the first light when the second light source is emitting the second light toward the object.

The second light source may be further configured to emit uniform light having uniform intensity.

The second light source may further include: a light emitter configured to emit light; an optical fiber configured to transmit the light emitted by the light emitter, wherein one end of the optical fiber is connected to the light emitter; a light controller configured to adjust an intensity of the light emitted by the light emitter; and a photodiode configured to feed back a part of the light that passed through the optical fiber to the light controller to thereby generate the uniform light.

The 3D camera may further include: a first controller configured to control the first light source, the image sensor, and the transmission type shutter; and a second controller configured to control the second light source.

The second controller may be further configured to control a wavelength and an intensity of the second light emitted by the second light source according to a signal transmitted from the first controller.

The 3D camera may further include a spectrometer configured to measure an intensity of the second light with respect to a wavelength of the second light source and transmit information about the intensity of the second light to the first controller.

The 3D camera may further include a beam splitter configured to align the second light to reach a same position on the object as a position reached by the first light.

The 3D camera may further include a beam expander configured to expand and radiate the second light of the second light source.

The 3D camera may further include a spectrometer configured to measure a wavelength of the first light.

The transmission type shutter may be one from among a PIN diode type shutter, an electro-optical type shutter configured to use the Pockel effect, or an electro-optical type shutter configured to use the Kerr effect.

The first light source may be one from among an edge-emitting laser, a vertical-cavity surface emitting laser, or a distributed feedback laser.

According to an aspect of another exemplary embodiment, there is provided a transmittance-measuring device of a three-dimensional (3D) camera including a transmission type shutter and a light source, the transmittance-measuring device including: a wavelength-variable light source configured to emit light toward an object, and to vary a wavelength of the light, the light being reflected from the object toward the transmission type shutter of the 3D camera, and the wavelength-variable light source being spaced apart from the transmission type shutter in order to be thermally unaffected by the transmission type shutter; and a light blocker configured to block light emitted by the light source of the 3D camera.

The device may further include an optical device configured to adjust a path of the light emitted by the wavelength-variable light source.

The optical device may include: an optical fiber configured to transmit the light emitted by the wavelength-variable light source; and a beam expander located at one end of the optical fiber and configured to expand the emitted light.

According to an aspect of another exemplary embodiment, there is provided a method of measuring transmittance of a three-dimensional (3D) camera system including a first light source configured to emit first light toward an object; a transmission type shutter configured to modulate the first light reflected from the object to generate modulated light; an image sensor configured to sense the modulated light that passes through the transmission type shutter; and a second light source that is spaced apart from the first light source, the image sensor, and the transmission type shutter in order to be thermally unaffected by the first light source, the image sensor, and the transmission type shutter, and is configured to emit second light toward the object and to vary a wavelength of the second light, the method including: operating the first light source and the transmission type shutter at the same frequency; blocking the first light emitted by the first light source; emitting the second light to the object so that the second light is reflected from the object to the transmission type shutter; and measuring an intensity of the second light that passes through the transmission type shutter and reaches the image sensor.

The method may further include varying a wavelength of the second light; and obtaining a center wavelength of the transmission type shutter when the intensity of the second light that passes through the transmission type shutter and reaches the image sensor is a maximum.

The method may further include correcting a difference between the center wavelength of the transmission type shutter and a wavelength of the first light.

The correcting the difference may include adjusting an operating current of the first light source and matching the wavelength of the first light with the center wavelength of the transmission type shutter.

The correcting the difference may include adjusting a driving voltage of the transmission type shutter and matching the center wavelength of the transmission type shutter with the wavelength of the first light.

The second light may reach a plurality of parts of the image sensor, and the method may further include comparing the intensity of the second light that reaches the plurality of parts of the image sensor and measuring uniformity corresponding to a position of the transmission type shutter, from among a plurality of image points of the object, based on the comparing.

BRIEF DESCRIPTION OF THE DRAWINGS

The above and/or other aspects will become apparent and more readily appreciated from the following description of the exemplary embodiments, with reference to the accompanying drawings in which:

FIG. 8 is a schematic block diagram illustrating a method of measuring a wavelength difference between a transmission type shutter and a first light source, according to another exemplary embodiment.

DETAILED DESCRIPTION

Figure 1A:
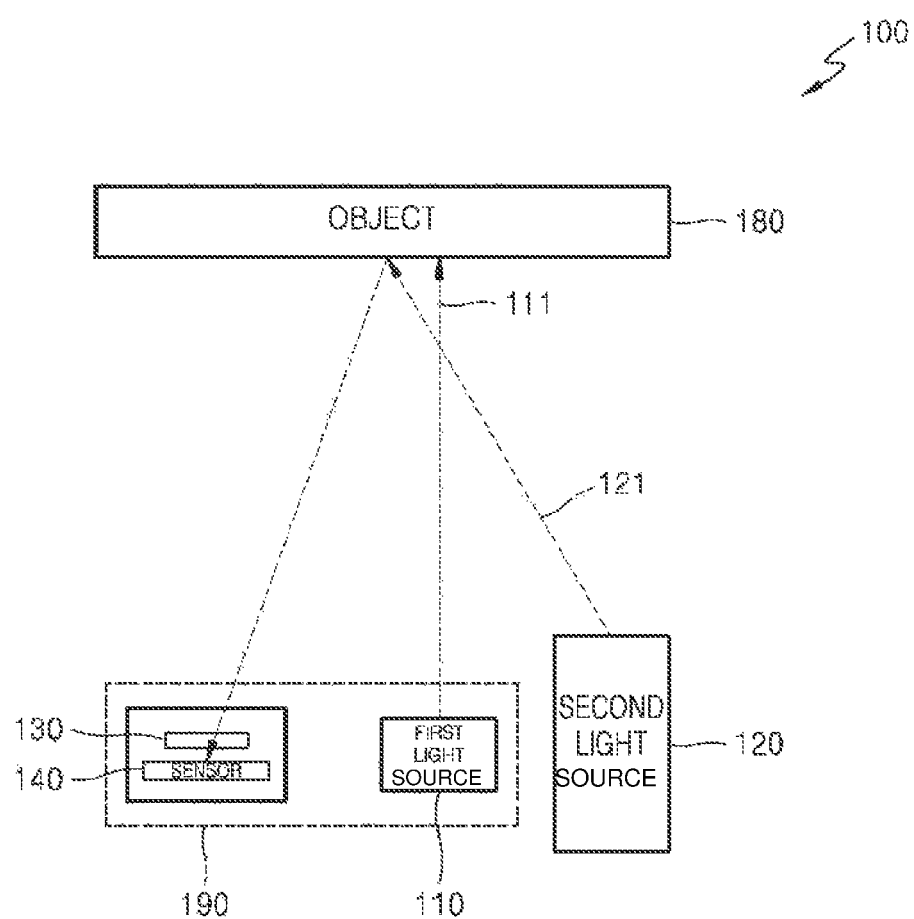
FIGS. 1A, 1B, 1C, 1D, 1E and 1F are views illustrating a structure and characteristics of a three-dimensional (3D) camera according to an exemplary embodiment.

Reference will now be made in detail to exemplary embodiments, examples of which are illustrated in the accompanying drawings, wherein like reference numerals refer to like elements throughout. Constituent elements having the same name may be formed of the same material. In the drawings, the sizes of layers and regions may be exaggerated for clarity. The exemplary embodiments described below are only examples, and thus, it should be understood that the exemplary embodiments may be modified in ways and to be embodied in various forms. For example, when an element is referred to as being "on the front side of" or "in front of" another element, the element may be directly on the other element, or intervening elements may also be present. Expressions such as "at least one of," when preceding a list of elements, modify the entire list of elements and do not modify the individual elements of the list.

FIGS. 1A, 1B, 1C, 1D, 1E and 1F are views illustrating a structure and characteristics of a three-dimensional (3D) camera according to an exemplary embodiment. FIG. 1A is a schematic view illustrating a structure and characteristics of a 3D camera 100 according to an exemplary embodiment. Referring to FIG. 1A, the 3D camera 100 according to an exemplary embodiment may include a first light source 110 for emitting (radiating) a first light 111 toward an object 180, a transmission type shutter 130 for modulating light reflected from the object 180, and an image sensor 140 for sensing a light passing through the transmission type shutter 130. The 3D camera 100 may further include a second light source 120 that is not thermally affected by a first light source 110, an image sensor 140, and a transmission type shutter 130 by being spaced apart from the first light source 110, the image sensor 140, and the transmission type shutter 130. The second light source 120 is capable of emitting second light 121 toward the object 180, wherein a wavelength of the second light 121 may be changed.

The 3D camera 100 may measure a distance to the object 180. The 3D camera 100 may use a time-of-flight (TOF) method. In the TOF method, a flight time of the first light 111 emitted toward the object 180, reflected from the object 180, and received at the image sensor 140 is measured. The measuring is performed based on a phase delay, and thus, the transmission type shutter 130, which performs modulation at high speed, is used. The transmission type shutter 130 is one type of electro-optical device among various types of electro-optical devices which are configured such that transmittance of light changes with a reverse bias voltage. A wavelength of light maximally transmitted by the transmission type shutter 130 is a center wavelength, and this wavelength may change according to a reverse bias voltage, and furthermore, according to a temperature of the transmission type shutter 130. In order for the 3D camera 100 to operate based on the TOF method, the first light source 110 and the transmission type shutter 130 may be modulated to have an identical frequency. This feature will be described below in detail. A process of deriving distance information based on an intensity of light measured by the image sensor 140 is referred to as demodulation, and maximum demodulation efficiency may be obtained when a wavelength of the first light 111 and the center wavelength of the transmission type shutter 130 match each other.

The first light source 110 may be a light source device emitting the first light 111 toward the object 180. For example, the first light source 110 may emit the first light 111 in an infrared region (range). The first light source 110 may prevent light in an infrared region from mixing with natural light in a visible light region such as sunlight. However, the first light source 110 may emit light in a variety of wavelength regions as well as light in an infrared region. In this case, correction for removing information of mixed natural light may be required. The first light source 110 may be a laser light source. For example, the first light source 110 may be one of an edge-emitting laser, a vertical-cavity surface emitting laser (VCSEL), and a distributed feedback laser.

Furthermore, the first light source 110 may further include an optical device. For example, the object 180 may include a diffuser for evenly emitting light. The first light 111 from the first light source 110 may be reflected from the object 180 and received at the image sensor 140 via the transmission type shutter 130. The first light 111 does not need to reach the transmission type shutter 130 while transmittance of the transmission type shutter 130 is measured via the second light source 120 which will be described below. Therefore, as illustrated in FIG. 1, an optical path of the first light 111 may not reach the transmission type shutter 130 or an additional device capable of blocking the first light 111 may be used. The measuring of transmittance may be performed under a heating condition due to operations of the first light source 110 and the transmission type shutter 130, and therefore, the first light source 110 may be in an operating state.

The second light source 120 may be a light source device emitting the second light 121 to the transmission type shutter 130. The second light source 120 may not be thermally affected by the first light source 110, the transmission type shutter 130, and the image sensor 140. In other words, temperatures of the second light source 120 may not be changed due to the operation of the first light source 110, the image sensor 140, and the transmission type shutter. To achieve this feature, the second light source 120 may be spaced apart from the first light source 110, the image sensor 140, and the transmission type shutter 130 by at least a predetermined distance, or may further include a thermal barrier 190 thermally separating the first light source 110, the image sensor 140, and the transmission type shutter 130 from the second light source 120. For example, the first light source 110, the image sensor 140, and the transmission type shutter 130 may be included in the thermal barrier 190, and the second light source 120 may be located outside the thermal barrier 190. For example, the thermal barrier 190 may be a case of the 3D camera 100.

The second light source 120 may change the wavelength of the second light 121. The second light source 120 may measure transmittance of the transmission type shutter 130 with a change of the wavelength. The second light 121 from the second light source 120 may be emitted toward the object 180 or the transmission type shutter 130. The second light source 120 may be a laser device, for example, a laser diode device. A wavelength variable region of the second light source 120 may include a center wavelength region of the transmission type shutter 130 to be measured. For example, when the 3D camera 100 uses the first light source 110 and the transmission type shutter 130 in an infrared region (e.g., 940 nm), a width of the wavelength variable region of the second light source 120 may be, for example, 890 nm to 990 nm including the infrared region. It is understood that exemplary embodiments are not limited to a range of 890 nm to 990 nm.

The second light source 120 may emit uniform light even if a wavelength of the second light 121 changes. The term "uniform" with respect to the phrase "uniform light" may refer to a feature that the intensity of the light with respect to time is constant. An intensity of light according to a wavelength of the second light source 120 may be constant. The transmittance of the transmission type shutter 130 may be defined as (an intensity of light reaching the image sensor 140)/(an intensity of light emitted by the second light source 120). For example, if the intensity of light emitted by the second light source 120 corresponding to a 900 nm wavelength is 100 and the intensity of the second light 121 reaching the image sensor 140 after passing through the transmission type shutter is 40, the transmittance of the transmission type shutter 130 corresponding to the 900 nm wavelength is 40/100=0.4. If the intensity of the second light 121 from the second light source 120 is constant regardless of a wavelength of the second light 121, a denominator of the above transmittance formula may be constant. Therefore, a relative value of the transmittance of the transmission type shutter 130 according to a wavelength may be calculated based only on the intensity of light received at the image sensor 140. Therefore, the operation of measuring the intensity of the second light 121 may be omitted during the operation of measuring of a center wavelength of the transmission type shutter 130, and thus, the overall measuring operation may be simplified. However, even if the intensity of light according to a wavelength of the second light source 120 is not constant, it is possible to measure the intensity of light according to a wavelength of the second light source 120 and generate a transmittance diagram thereof by a separate spectrometer. Therefore, the intensity of the second light is not required to be constant all the time.

The second light source 120 may be used for directly measuring the transmittance of the transmission type shutter 130. A thermometer may be included in the 3D camera 100 to be used in an indirect measuring method. However, when using a thermometer, a measured temperature value may be different from temperatures of the first light source 110 and the transmission type shutter 130, and thus, errors may occur when the transmittance is calculated. When the second light source 120 is used, the second light source 120 may directly emit the second light 121 to the transmission type shutter 130 without being thermally affected by the first light source 110, the transmission type shutter 130, and the image sensor 140.

Figure 1B:
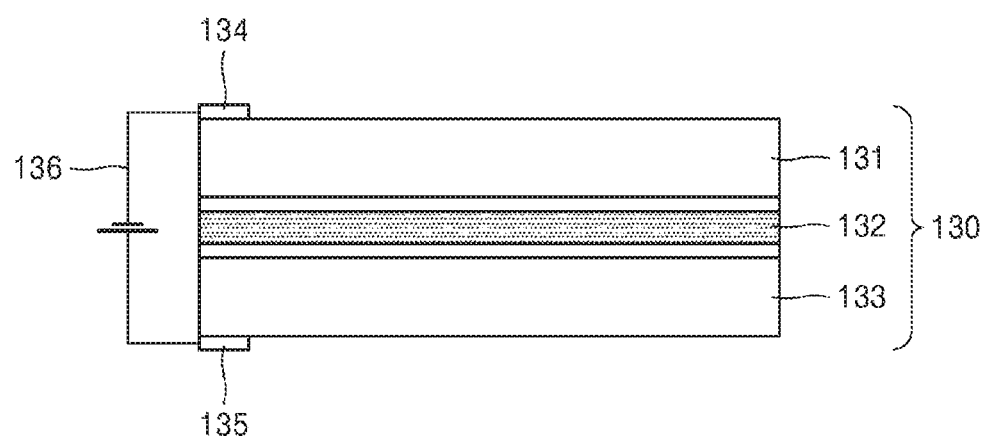

The transmission type shutter 130 may be an electro-optical device modulating light that passes through the transmission type shutter 130. The transmission type shutter 130 and the first light source 110 may be modulated to have an identical frequency $\omega$. For example, the first light source 110 may be represented as A sin($\omega$t) when the first light 111 emitted from the first light source 110 is modulated at frequency $\omega$. When the first light 111 bounces off the object 180 and is reflected therefrom, the first light 111 may be represented as B+C sin($\omega$t+$\varphi$), that is, an intensity and phase of the first light 111 are changed. As the transmittance of the transmission type shutter 130 is also modulated at sin($\omega$t) while the first light 111 passes through the transmission type shutter 130, an intensity of the first light 111 that passed through the transmission type shutter 130 may be represented as B sin(ωt)+C sin(ωt) sin(ωt+φ). The first light 111 may be received at the image sensor 140, and an intensity of light measured in the image sensor 140 during one period may be represented as a periodic value of B sin(ωt)+C sin(ωt) sin(ωt+φ) integrated over time. B sin(ωt) disappears and only the term φ in C sin(ωt) sin(ωt+φ) remains after the integration. The period may be determined based on the frequency ω during a modulating operation. Since information, such as velocity, position, etc., of the light related to φ is superimposed during every 2π unit, it is possible to derive an accurate distance from φ by adding a fixed phase delay during modulation of the transmission type shutter 130. For example, it is possible to derive a deviation by performing a photographing operation with the transmission type shutter 130 after delaying the light by a phase of about π/2, π, and 3π/2 and comparing respective light intensity information. In order to measure the deviation, the transmission type shutter 130 may have electro-optical characteristics whereby transmittance of the light through the transmission type shutter 130 changes with an applied voltage. As illustrated in FIG. 1B, the transmission type shutter 130 may be an electro-optical device having a PIN diode structure. For example, the transmission type shutter 130 may be an electro-optical device using a multiple quantum well (MQW) method and may be formed on a GaAs substrate. Furthermore, the transmission type shutter 130 may be an electro-optical device using the Pockel effect or the Kerr effect. The PIN diode structure may include a P-type region 131, an N-type region 133, an intrinsic layer 132 provided between the P-type region 131 and the N-type region 133, an anode 134, a cathode 135, and a power source 136, which may be modified in various ways, as would be appreciated by an artisan having ordinary skill in the art.

Figure 1C:
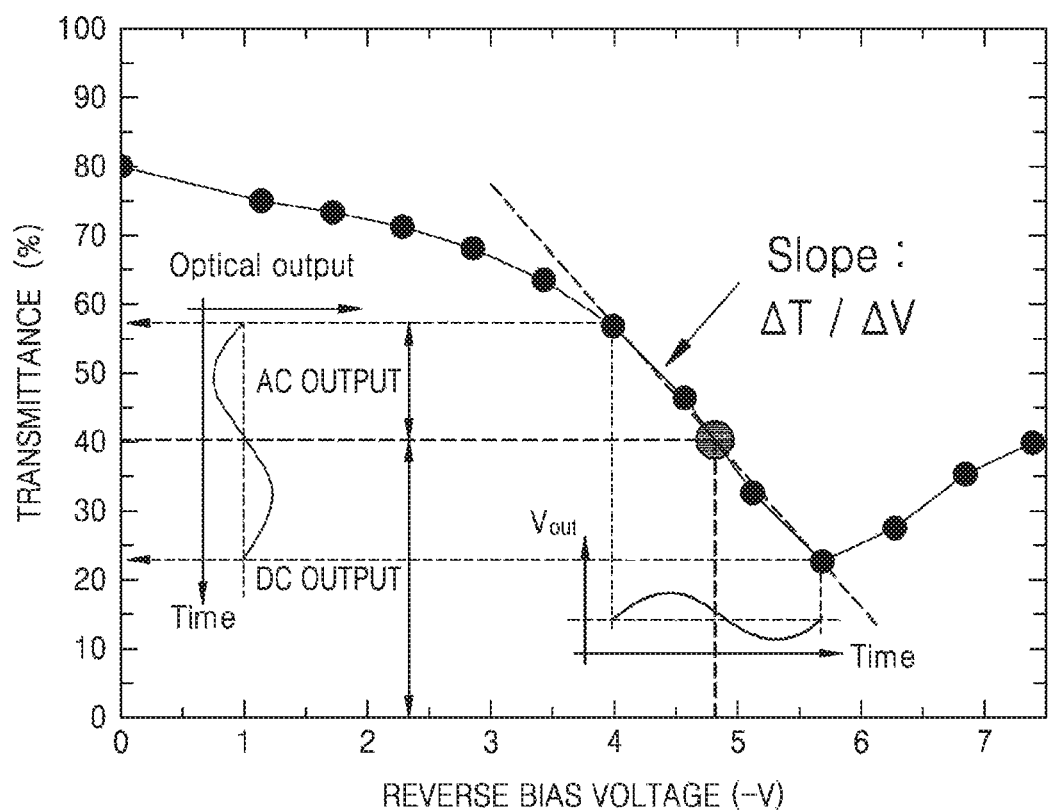

Transmittance of the transmission type shutter 130 may vary with an applied reverse bias voltage. Referring to FIG. 1C, an x-axis indicates a reverse bias voltage (−V) applied to the transmission type shutter 130, and a y-axis indicates transmittance (%) of the transmission type shutter 130. A region illustrated with dotted lines is an operating region due to an AC voltage and a DC voltage applied to the transmission type shutter 130. Regarding the operating region, the DC voltage corresponds to a center position of the operating region, and operates the transmission type shutter 130, which only transmits the light having a certain wavelength corresponding to the operating region. Regarding the operating region, the AC voltage corresponds to a swing component changing the transmittance into a sin, cos function type. For example, if the magnitude of the DC voltage applied to the transmission type shutter 130 is $V_{dc}$, and the amplitude of the AC voltage applied to the transmission type shutter 130 is $V_{ac}$, then, the transmission type shutter operates from $V_{dc}-V_{ac}$ to $V_{dc}+V_{ac}$. An amplitude of the AC voltage may be freely selected, but preferably, may be less than the magnitude of the DC voltage because, if the amplitude of the AC voltage is greater than the magnitude of the DC voltage, a voltage may be 0 V or lower in some parts during a swing process, and thus, the transmission type shutter 130 may not be operated. The magnitude of the DC voltage may also be freely selected, but preferably, may be in a range in which the transmittance linearly changes according to a change in a voltage. As an inclination of the linear section becomes steeper, a transmittance difference may become larger according to a change of a voltage. Therefore, distance precision of the 3D camera 100 may become higher by reducing noise. The inclination indicates a demodulation contrast and may be changed according to types and materials of the transmission type shutter 130. A graph of FIG. 1C is an exemplary graph of a GaAs type MQW transmission type shutter and may vary with a type of the transmission type shutter 130. In the graph, a DC voltage of a reverse bias voltage is about −4.8V, and transmittance of the transmission type shutter 130 is about 40%. As an AC voltage is 0.8V based on the DC voltage, the reverse bias voltage may change from −4V to −5.6V. Therefore, the transmittance may change from 20.2% to 58.5%. The DC voltage and the AC voltage may be set such that the transmittance linearly changes. Since a point in time of when the reverse bias voltage is −5.8V in the graph corresponds to a last point of a linear part in the transmittance change, an operating efficiency of the transmission type shutter 130 may be reduced when the reverse bias voltage exceeds −5.8V. If it is required or desired to operate the transmission type shutter 130 in a region of −6V or higher, the magnitude of the DC voltage and the AC voltage may be determined so that the transmission type shutter 130 may operate in a region where a right inclination of the graph becomes a positive number.

Figure 1D:
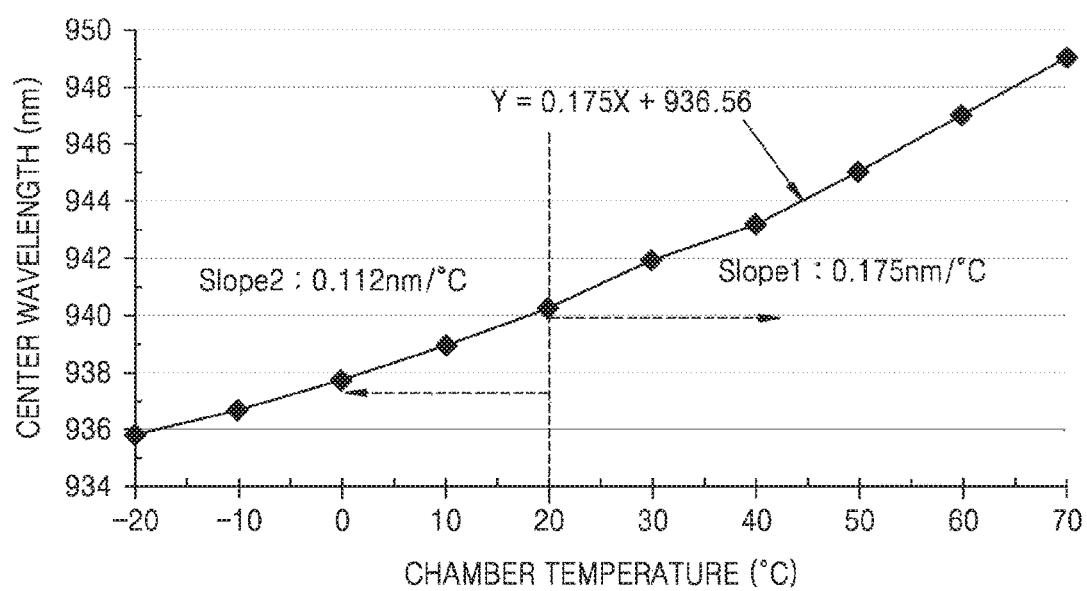
Figure 1E:
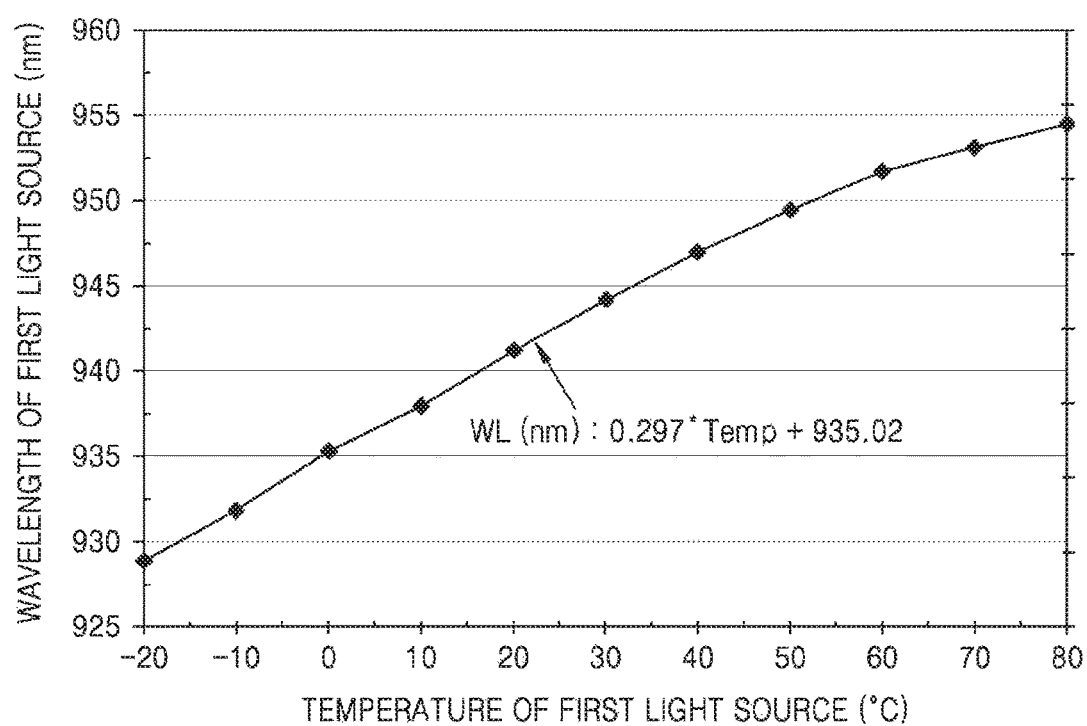
Figure 1F:
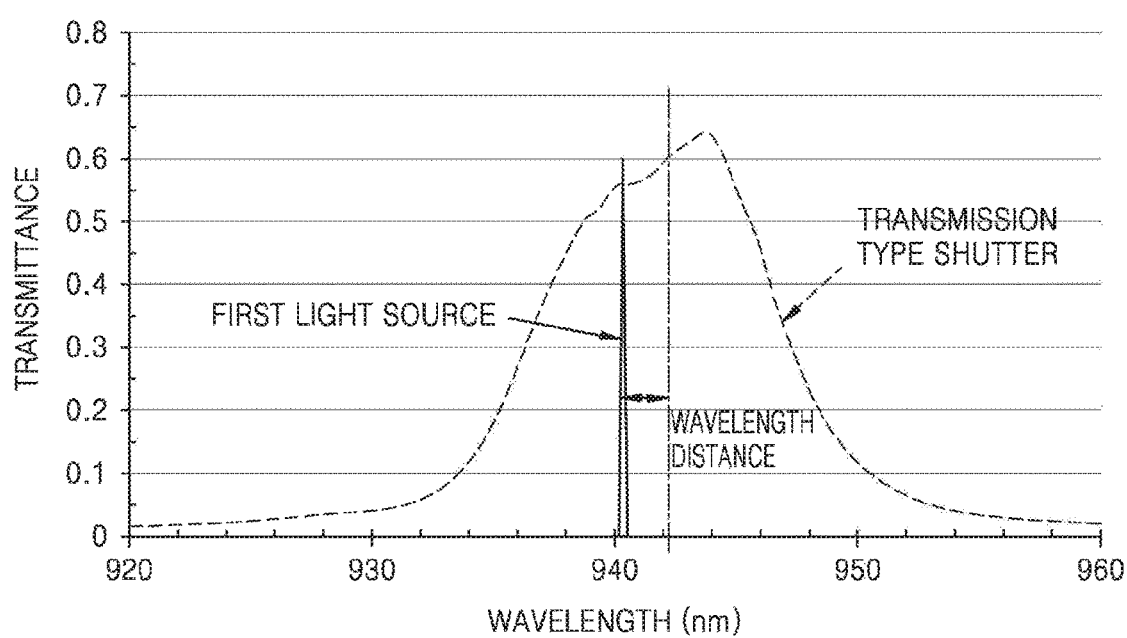

Referring to FIG. 1F, the transmission type shutter 130 has a transmittance of a peak value corresponding to a specific wavelength of an incident light and does not have uniform transmittance corresponding to every wavelength of the incident light. The peak value corresponds to a center wavelength of the transmission type shutter 130. The center wavelength of the transmission type shutter 130 is a function of a voltage and temperature, and may change according to a reverse bias voltage applied to the transmission type shutter 130 and a peripheral temperature. When the transmission type shutter 130 is operated via the AC voltage, heat according to the operation thereof is generated to be proportional to a square of the AC voltage, and thus, the center wavelength of the transmission type shutter 130 may change due to a temperature change thereby. However, if the AC voltage is too low, the above demodulation contrast may become lower and cause deterioration of a function of the transmission type shutter 130. On the other hand, if the AC voltage is too high, a voltage becomes 0V or lower as a voltage swing becomes too large, and the transmission type shutter 130 may stop operating. Therefore, the center wavelength of the transmission type shutter 130 may be adjusted by adjusting the AC voltage within an operating range of the transmission type shutter 130.

Furthermore, the center wavelength of the transmission type shutter 130 may also change according to the temperature change. Heat caused by the first light source 110 and the image sensor 140 and heat caused by the transmission type shutter 130 may raise an internal temperature of the 3D camera 100. The temperature rise may keep changing the temperature of the transmission type shutter 130. Accordingly, the center wavelength of the transmission type shutter 130 may also change. Referring to FIG. 1F, the center wavelength of the transmission type shutter 130 and a wavelength of the first light source 110 may be spaced apart from each other. Referring to FIG. 1D, the center wavelength of the transmission type shutter 130 moves so that the center wavelength increases as the temperature increases.

The wavelength of the first light 111 and the center wavelength of the transmission type shutter 130 may match each other during the transmittance measuring operation described above. However, the wavelength of the first light 111 and the center wavelength of the transmission type shutter 130 may continuously change due to heat according to operations of thereof. When the center wavelength of the transmission type shutter 130 changes due to a temperature change, an intensity of light received at the image sensor 140 may decrease due to the change of the center wavelength as well the reduction in transmittance, and therefore, the demodulation efficiency may be lowered. Therefore, it is possible to increase the demodulation efficiency by matching the center wavelength of the transmission type shutter 130 according to temperature with the wavelength of the first light 111 by adjusting the amplitude of the AC voltage. Referring to FIG. 1E, the wavelength of the first light source 110 may increase as the temperature rises. As the wavelength of the first light source 110 may vary with a magnitude of an operating current applied to the first light source 110, the magnitude of the operating current may be adjusted in order to match the wavelength of the first light source 110 with the center wavelength of the transmission type shutter 130.

The image sensor 140 may be a charge-coupled device (CCD) or a complementary metal oxide semiconductor (CMOS), which are types of image sensors frequently used in a typical two-dimensional (2D) camera imaging system. Thus, cost may be reduced since a separate image sensor for the 3D camera 100 is not required.

Figure 2:
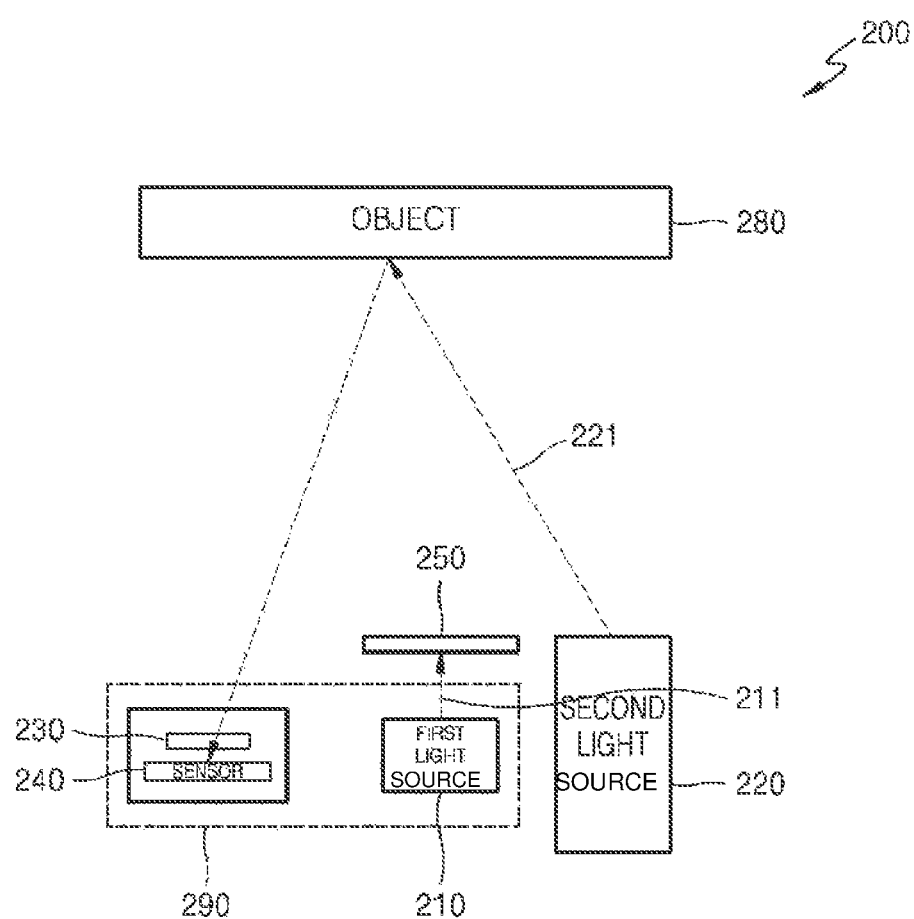
FIG. 2 is a schematic view of a 3D camera according to another exemplary embodiment.

FIG. 2 is a schematic view of a 3D camera 200 according to another exemplary embodiment.

Referring to FIG. 2, a light blocking unit 250 (e.g., light blocker) for blocking a first light 211 may be provided in front of a light source 210. The light blocking unit 250 may prevent the first light 211 from being incident on a transmission type shutter 230 as the first light source 210 should be in an operating state for measuring transmittance of the transmission type shutter 230. The light blocking unit 250 may be an impermeable film through which light cannot pass. Alternatively, the light blocking unit 250 may be a polarizer that changes directions of light so that the first light 211 may not be incident on the transmission type shutter 230. When the first light source 210 includes a diffuser and emits the first light 211 toward an object 280 in a wide range of angles, it may be useful to implement the light blocking unit 250 as an impermeable film capable of blocking the first light 211. The light blocking unit 250 may be required for operating a second light source 220 to measure the transmittance of the transmission type shutter 230, and may be controlled by a first controller 701 (of FIG. 7A) or a second controller 702 (of FIG. 7A) to block the first light source 210 only when the second light source 220 is in operation. The first controller 701 and the second controller 702 will be described below. The image sensor 240 and thermal barrier 290 may be the same as the image sensor 140 and thermal barrier 190, respectively.

Figure 3:
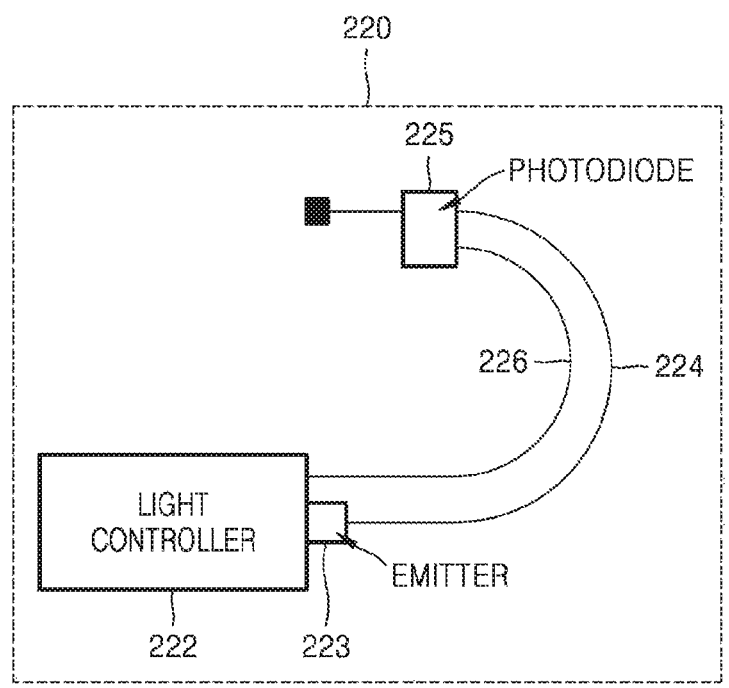
FIG. 3 is a schematic view of a second light source having a constant intensity of light with respect to varying a wavelength of the light, according to an exemplary embodiment.

FIG. 3 is a schematic view of the second light source 220 having a constant intensity of the light with respect to varying a wavelength of the light, according to an exemplary embodiment. Referring to FIG. 3, the second light source 220 may further include a light controller 222 which adjusts an intensity of light, a light emitter 223 which emits light, an optical fiber 224 that is flexible and may transmit light as one end thereof is connected to the light emitter 223, a photodiode 225 which feeds back some of the light that passed through the optical fiber 224 to the light controller 222, and a cable 226 which transmits a signal fed back from the photodiode 225 to the light controller 222. Accordingly, it may be easier to generate a transmittance diagram when the intensity of the second light 221 of the second light source 220 is constant. Therefore, the second light source 220 may act as a feedback system and maintain the intensity of the second light 221. The light emitter 223 may be, for example, a laser diode. The optical fiber 224 is not limited to any particular type of material as long as the optical fiber 224 is able to transmit the second light 221 (of FIG. 2) through total internal reflection. If the optical fiber 224 is flexible, it is easy to set an incident angle of the second light 221. The photodiode 225 located in a part of the optical fiber 224 may feed back light in a certain ratio with respect to the emitted second light 221 to the light controller 222. The light controller 222 may adjust the intensity of the second light 221 to be constant based on an intensity of the fed back light, in which the fed back light is continuously transmitted from the photodiode 225 to the light controller 222.

Figure 4:
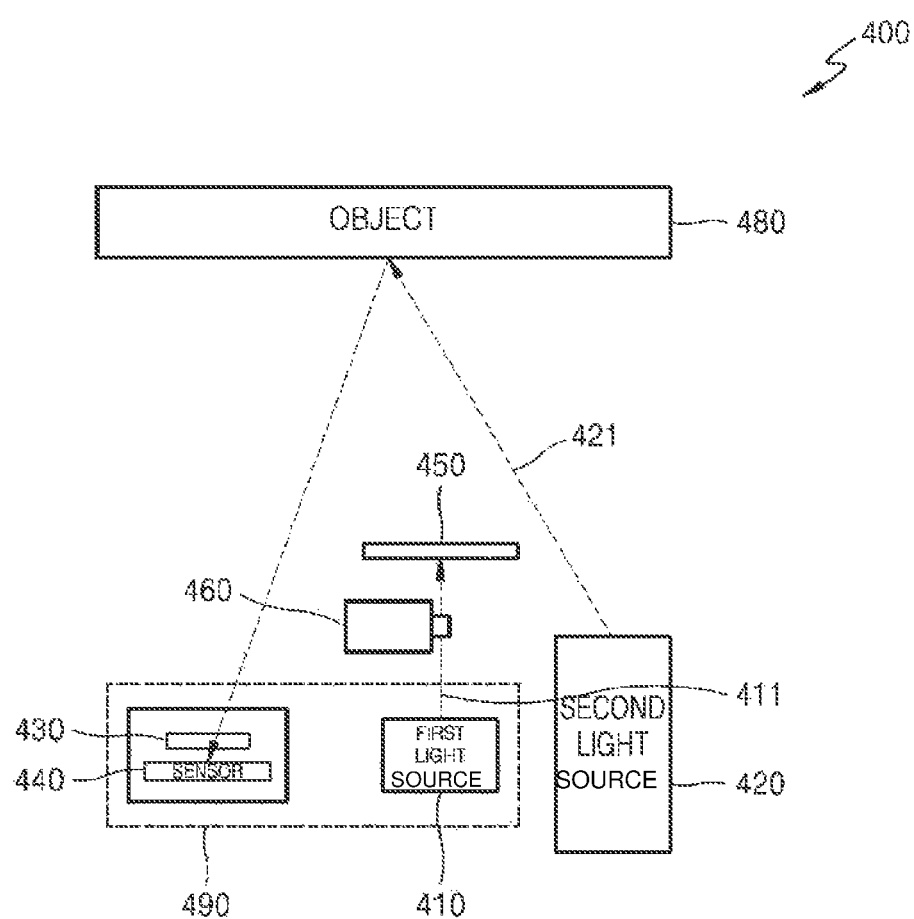
FIG. 4 is a schematic view of a 3D camera according to another exemplary embodiment.

FIG. 4 is a schematic view of a 3D camera 400 according to another exemplary embodiment. Referring to FIG. 4, the 3D camera 400 according to an exemplary embodiment may further include a spectrometer 460 for measuring a wavelength of a first light 411. As described above, the wavelength of the first light 411 may change according to a magnitude of an operating current applied to a first light source 410 and a temperature of the first light source 410. Therefore, the wavelength of the first light 411 may also be measured to measure a difference between a wavelength of the first light source 410 and a center wavelength of a transmission type shutter 430. The wavelength of the first light 411 may be measured via the spectrometer 460 and be used to change a wavelength difference. The second light source 420 may emit the second light 421 in substantially the same fashion as the second light source 120 emits the second light 121. Additionally, the image sensor 440, light blocking unit 450, object 480 and thermal barrier 490 may be substantially the same as the image sensor 140, light blocking unit 250, object 180 and thermal barrier 190, respectively.

Figure 5A:
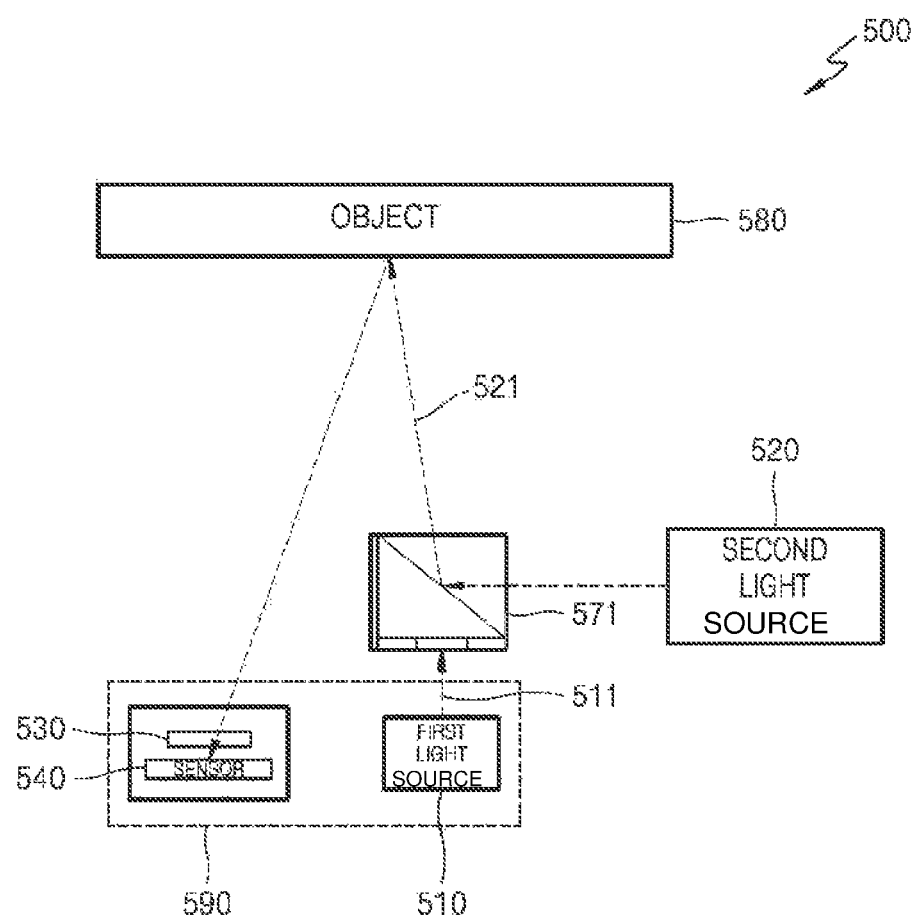
FIGS. 5A and 5B are schematic views of a 3D camera according to another exemplary embodiment.
Figure 5B:
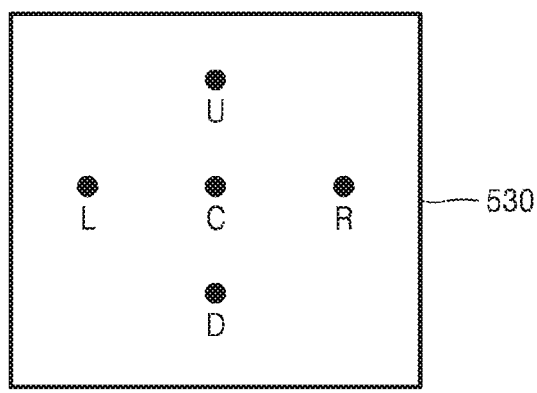

FIGS. 5A and 5B are schematic views of a 3D camera 500 according to another exemplary embodiment. Referring to FIG. 5A, an optical device capable of changing an optical path may be provided to change a path of second light 521 emitted from a second light source 520 toward an object 580. The optical device may be, for example, a beam splitter 571. When the second light source 520 is used as a laser light source, the second light 521 may be emitted in a very narrow range without a separate optical device like a beam expander. The second light 521, which is emitted toward the object 580 at a certain angle through the beam splitter 571, may be emitted toward a transmission type shutter 530 after being reflected from the object 580. The transmission type shutter 530 may have a 2D structure with a certain area, and the second light 521 may be emitted toward a part of the 2D structure of the transmission type shutter 530, which is disposed near the image sensor 540. Referring to FIG. 5B, the part of the transmission type shutter 530 toward which the second light 521 is emitted may include a center portion C, un upper portion U, a left portion L, a right portion R, and a down portion D. Thus, it is possible to examine transmission uniformity of the transmission type shutter 530 by examining and comparing transmittances of each portion of the transmission type shutter 530 based on the second light 521. The 3D camera 500 according to an exemplary embodiment is able to measure the transmission uniformity of the transmission type shutter 530 by using the second light source 520 without requiring a user of the 3D camera 500 to disassemble the transmission type shutter 530, and thus, may be used as a performance inspection device. Furthermore, a beam splitter 571 may match incident positions of a first light 511 emitted from a first light source 510 and the second light 521 emitted from the second light source 520 so that the first light 511 and the second light 521 are emitted toward the object 580 at the same position. Therefore, it is easy to use the beam splitter 571 when measuring transmittance and transmission uniformity of the transmission type shutter 530 and further measuring a distance between the object and the 3D camera 500 because it is easy to use the 3D camera 500 after measuring the transmittance, as there is no need to additionally adjust a position of the 3D camera 500. In this case, the user only removes a light blocking unit between the beam splitter 571 and the first light source 510 and stops an operation of the second light source 520. The thermal barrier 590 may be substantially the same as the thermal barrier 190.

Figure 6:
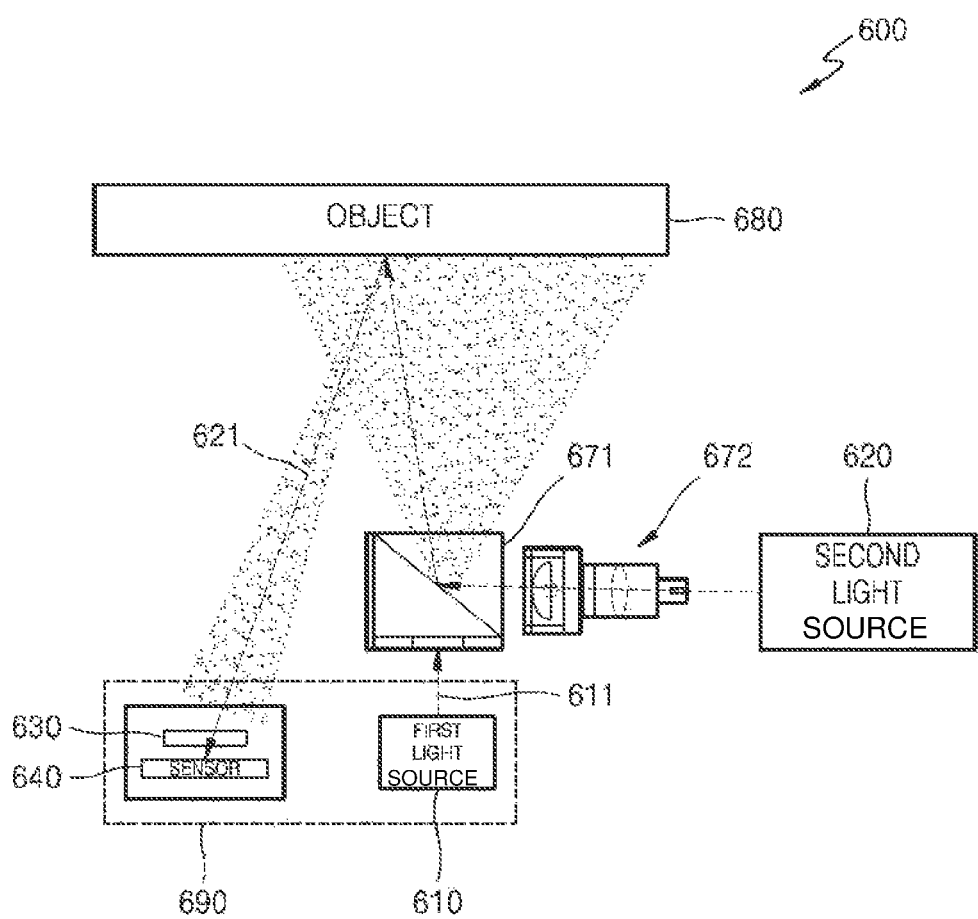
FIG. 6 is a schematic view of a 3D camera according to another exemplary embodiment.

FIG. 6 is a schematic view of a 3D camera 600 according to another exemplary embodiment. A beam expander 672 is provided on the front side of the second light source 620 and second light 621 may be widely emitted toward an object 680. The second light 621 reflected from the object 680 may be incident to the entire area of the transmission type shutter 630. The 3D camera 600 according to an exemplary embodiment may obtain a transmittance diagram by measuring an average value of light, which passes through the transmission type shutter 630 and is sensed by an image sensor 640. The image sensor 640 may measure an intensity of light sensed in unit periods as described above. Furthermore, information processing for obtaining a transmittance diagram may be performed by a first controller 701 (of FIG. 7A) which will be described below. The first light source 610 may emit first light 611 in substantially the same fashion as the first light source 110 emits first light 111. Additionally, the beam splitter 671 and thermal barrier 690 may be substantially the same as the beam splitter 571 and thermal barrier 190, respectively.

Figure 7A:
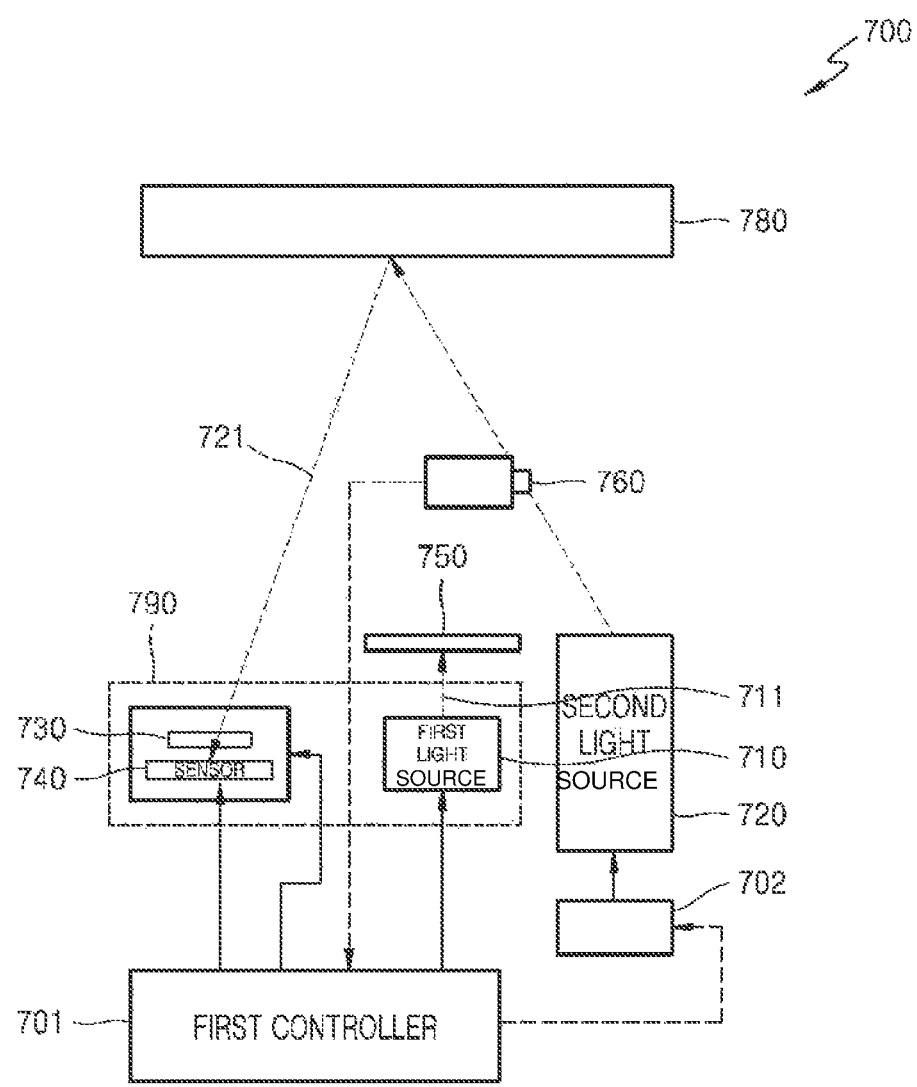
FIGS. 7A and 7B are schematic views of a 3D camera according to another exemplary embodiment.
Figure 7B:
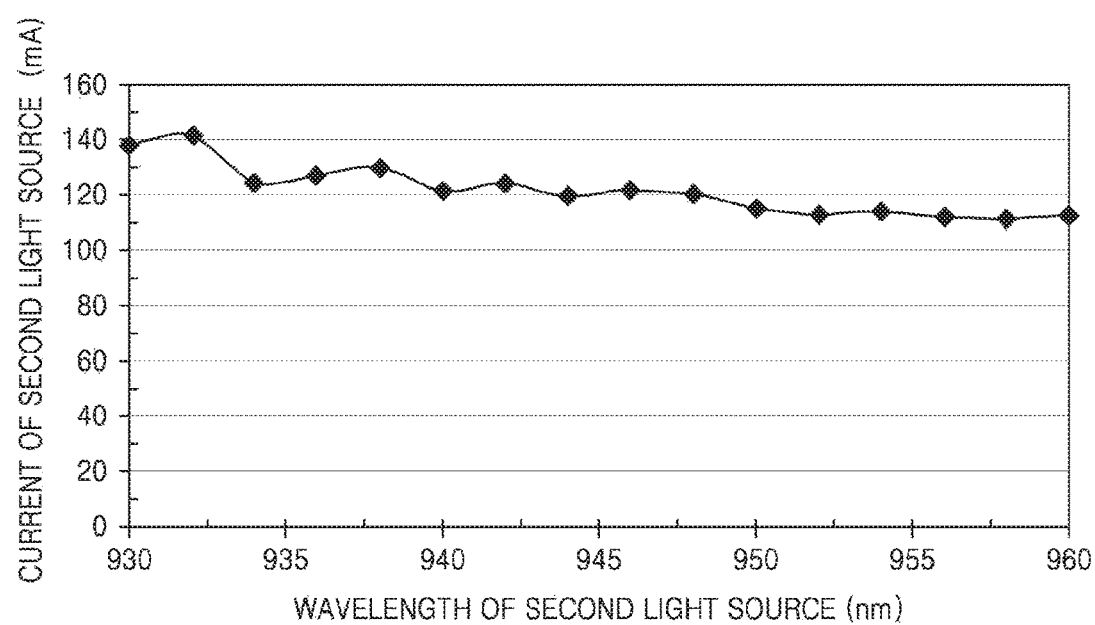

FIGS. 7A and 7B are schematic views of a 3D camera 700 according to another exemplary embodiment. Referring to FIG. 7A, the 3D camera 700 according to an exemplary embodiment may include a first light source 710, a first controller 701 controlling an image sensor 740 and a transmission type shutter 730, and a second controller 702 controlling a wavelength and an intensity of the second light 721 emitted by a second light source 720.

The first controller 701 may demodulate the transmission type shutter 730 and the first light source 710 which emits first light 711 at the same frequency ω towards the object 780. The first controller 701 may apply a reverse bias voltage to the transmission type shutter 730 and may apply an operating current to the first light source 710. The first controller 701 may receive information about a measured intensity of light from the image sensor 740. Furthermore, the first controller 701 may receive information about a wavelength and the intensity of the second light 721 from the second controller 702. The first controller 701 may generate a transmittance diagram of the transmission type shutter 730 by combining the information about a wavelength and an intensity of the second light received from the second controller 702 with the information about a measured intensity of light received from the image sensor 740. The transmittance diagram may be processed in the 3D camera 700 or may be transmitted to the outside. For example, the 3D camera 700 may transceive a signal by being connected to an electronic processor like a personal computer (PC). In detail, the first controller 701 and the electronic processor may be connected to each other. The second controller 702 may be connected to the first controller 701 indirectly via the electronic processor. The connection may be of a wire type or a wireless type. The first controller 701 may include a separate memory device for processing the obtained transmittance diagram. The memory device may be a nonvolatile memory device such as an electrically erasable programmable read-only memory (EEPROM).

The second controller 702 may control a wavelength and a light emitting operation of the second light source 720 that emits second light 721 and may be electrically connected to the first controller 701. The second controller 702 may adjust the wavelength and the light emitting operation of the second light source 720 according to an electrical signal of the first controller 701. Since the second controller 702 is connected to the first controller 701, wavelength difference information according to a temperature state of the transmission type shutter 730 may be continuously measured by the first controller 701, and thus, a demodulation efficiency of the 3D camera may be increased by adjusting the wavelength and the light emitting operation of the second light source 720. Furthermore, when the light emitting operation of the second light source 720 is not adjusted, a separate spectrometer 760 may be used for measuring the intensity of the second light 721 as described above. Referring to FIG. 7A, the wavelength and the intensity of the second light 721 may be accurately measured as a part of the second light 721 is incident to the spectrometer 760. The first controller 701 may correct the transmittance diagram by receiving information about the measured wavelength and intensity from the spectrometer 760. FIG. 7B is a graph illustrating an intensity of a current according to a wavelength when the second light source 720 operates in a fixed light-emitting mode. Referring to the graph of FIG. 7B, it can be seen that the intensity of a current according to a wavelength changes although the second light source 720 is being operated in a constant mode which generates the second light 721 having constant light intensity regardless of a wavelength of the second light 721. Therefore, an error in the transmittance diagram may be reduced by providing the separate spectrometer 760 and measuring an actual intensity of light per wavelength of the second light source 720 thereby. However, in the case of the second light source 220 (of FIG. 3), the separate spectrometer 760 may not be required as the intensity of light may be constant via an intensity of light feedback system that is separately provided.

The second light source 720, a light blocking unit 750, and the second controller 702 may form a separate transmittance-measuring device for measuring transmittance of many types of 3D cameras, and not merely for the 3D camera 700. The transmittance-measuring device may be used to perform a performance test of many types of 3D cameras in a manufactured state. For example, the second controller 702 may control, via the measuring device, the second light source 720 and the light blocking unit 750 in order to obtain a transmittance diagram of the 3D camera in a manufactured state. The second controller 702 may operate the second light source 720 to emit light toward a transmission type shutter of a corresponding 3D camera while a wavelength of the emitted light is varying and may control the light blocking unit 750 to block a light source of the corresponding 3D camera. For example, the second light source 720 may emit the light directly toward the transmission type shutter of the corresponding 3D camera or emit the light indirectly, the light being reflected from the object toward the transmission type shutter of the 3D camera. Thus, it is possible to simplify the performance test since there is no need to disassemble the 3D camera 700. Furthermore, it is possible to emit the second light source 720 to only a part of the transmission type shutter of the 3D camera 700 and measure transmittance of the part. Accordingly, transmission uniformity of the transmission type shutter may also be measured by determining whether transmittance of each part of the transmission type shutter is constant. The thermal barrier 790 may be substantially the same as the thermal barrier 190.

FIG. 8 is a schematic block diagram illustrating a method of measuring a wavelength difference between a transmission type shutter and a first light source, according to another exemplary embodiment. Referring to FIG. 8, a center wavelength of the transmission type shutter via a second light source and a wavelength of the first light source are respectively measured, and the wavelength difference may be determined.

In operation S810, the first light source and the transmission type shutter may be operated to be modulated at the same frequency. In other words, a frequency component of an operating current applied to the first light source and a frequency component in an AC component of a reverse bias voltage applied to the transmission type shutter may match each other. The modulation at the same frequency of the first light source and the transmission type shutter may correspond to a typical operating state of a 3D camera. Therefore, phase information may be extracted from an intensity of light measured by an image sensor when the modulation at the same frequency is performed. Since the first light source and the transmission type shutter are in an operating state, temperature of the first light source and the transmission type shutter change as heat is generated therein. Therefore, the wavelength of the first light source and the center wavelength of the transmission type shutter may vary. Respective phase components of the transmission type shutter and the first light source do not necessarily match each other.

In operation S811, in order not to emit a first light from the first light source, the first light may be blocked by using a light blocking unit in front of the first light source or an optical path of the first light may be changed.

In operation S812, a wavelength variation range of the second light source may be set. As described above, the wavelength variation range of the second light source may be set to include a range of the center wavelength of the transmission type shutter. Therefore, several testing operations may be required. Alternatively, the wavelength variation range of the second light source may be set based on the range of the center wavelength of the transmission type shutter which is already known. The wavelength variation range may be set from $\lambda_{min}$ which is a minimum wavelength to $\lambda_{max}$ which is a maximum wavelength. Furthermore, the wavelength variation range may be set to $\Delta\lambda$ which is a numerical value according to wavelength variation. Alternatively, the second light source may have a present $\Delta\lambda$.

In operation S813, second light may be emitted toward the transmission type shutter by the second light source. The second light may be emitted toward the transmission type shutter after being emitted and reflected to or from an object, or may be directly emitted toward the transmission type shutter.

In operation S814, an intensity of the second light may be measured by the image sensor after the second light passes through the transmission type shutter. As the intensity of light measured by the image sensor may change according to a transmittance of the transmission type shutter, a transmittance diagram may be obtained.

In operation S815, a wavelength A of the second light is compared with the maximum wavelength $\lambda_{max}$ set in advance. If the wavelength A of the second light is greater than the maximum wavelength $\lambda_{max}$, a transmittance diagram of the transmission type shutter is obtained in operation S817). Otherwise, the wavelength is increased by $\Delta\lambda$ and operations S812, S813 and S814 may be repeated. $\Delta\lambda$ may be determined by a user or may be determined in various other ways (e.g., automatically).

In operation S830, if the intensity of the second light emitted by the second light source according to a wavelength of the second light is not constant, it is possible to correct the intensity of the second light based on the transmittance diagram of the transmission type shutter. The correction may be performed by a first controller.

In operation S818, the center wavelength of the transmission type shutter may be measured based on the obtained transmittance diagram.

In operation S820, a wavelength of the first light source is measured through a spectrometer separately from the process of obtaining the transmittance diagram. Furthermore, in operation S819, a wavelength difference may be determined between the wavelength of the first light source and the center wavelength of the transmission type shutter.

Figure 9A:
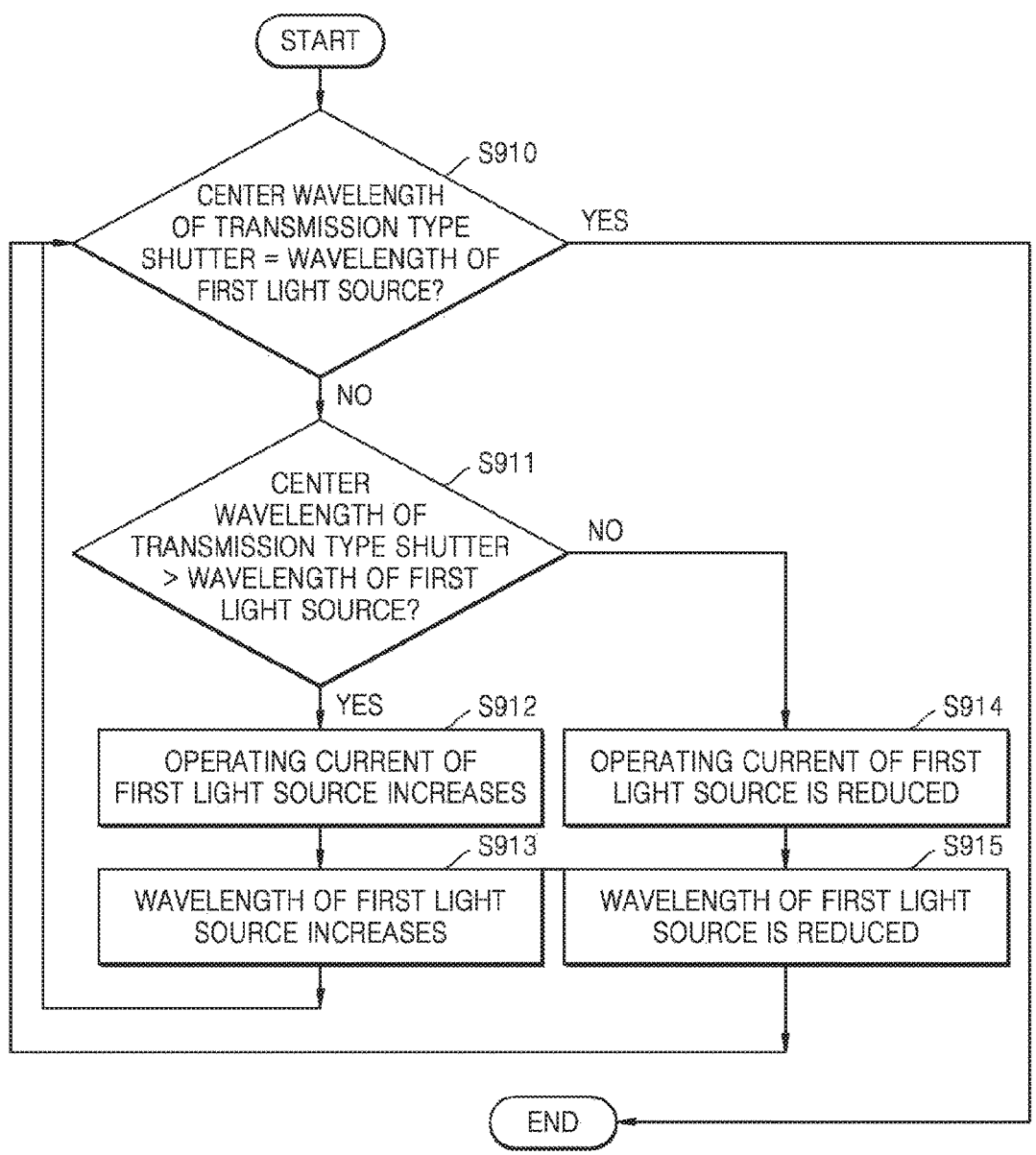
FIGS. 9A, 9B and 9C are schematic views illustrating a method of correcting a wavelength difference, according to another exemplary embodiment.
Figure 9B:
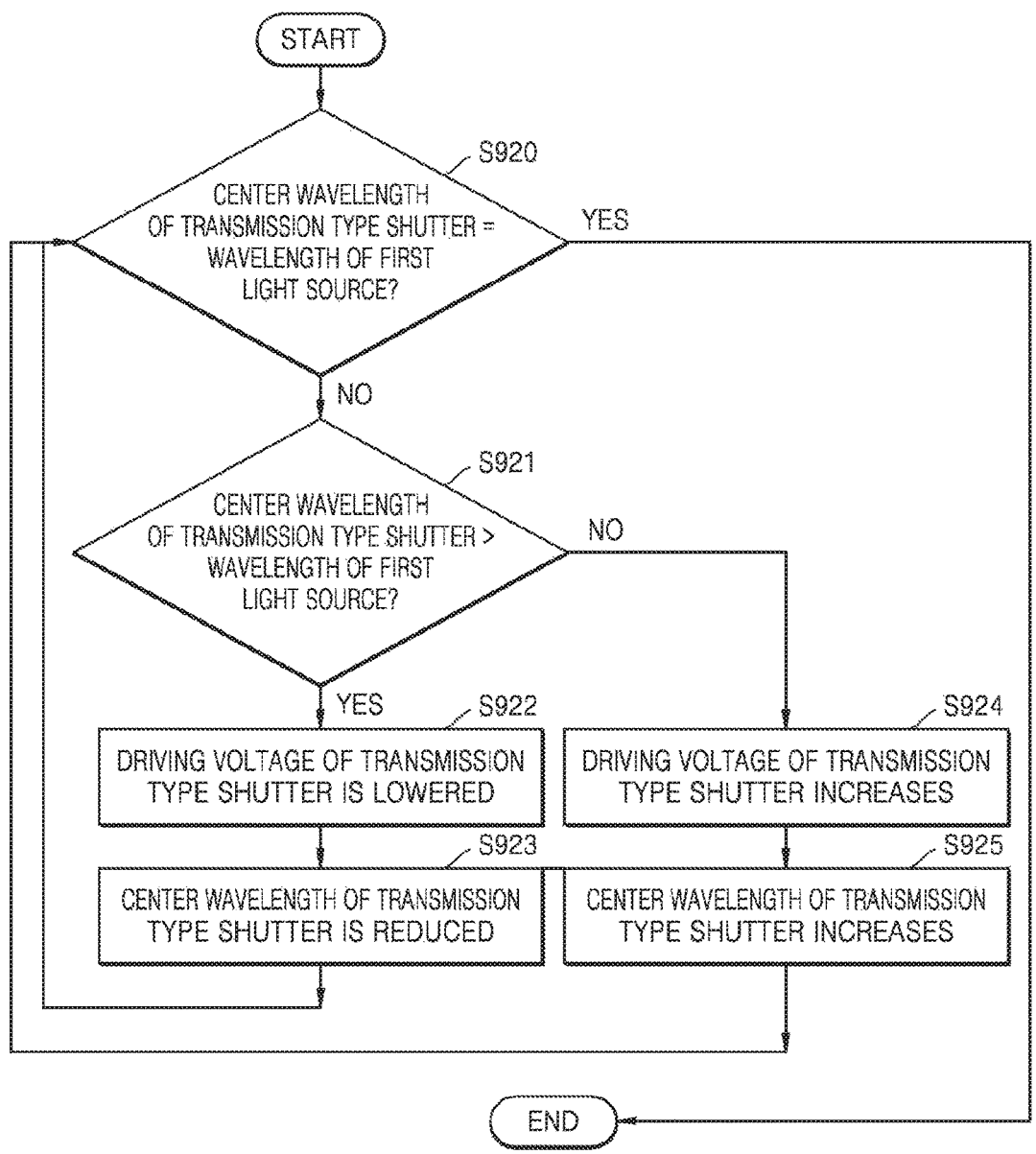
Figure 9C:
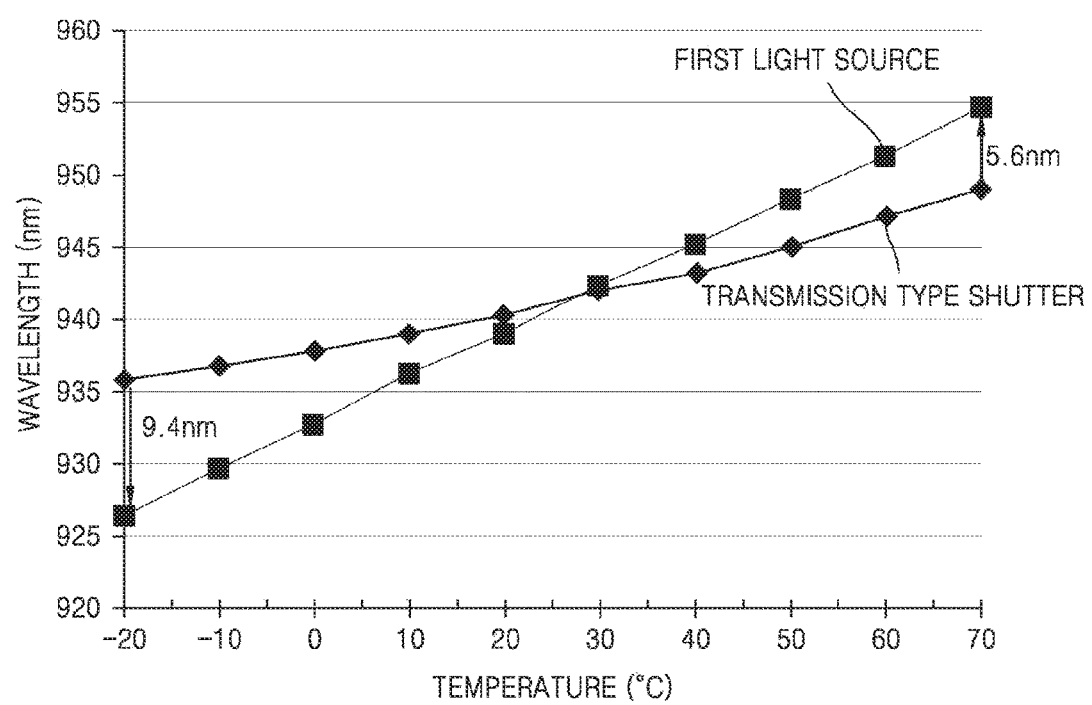

FIGS. 9A to 9C are schematic views illustrating a method of correcting a wavelength difference, according to another exemplary embodiment. According to a wavelength obtained in the process of FIG. 8, the wavelength difference may be corrected by adjusting a center wavelength of a transmission type shutter or a wavelength of a first light source. As described above, demodulation efficiency increases as the wavelength difference decreases. Therefore, it is possible to further increase the demodulation efficiency of the 3D camera by minimizing the wavelength difference.

Referring to FIG. 9A, it is possible to change the wavelength difference by adjusting an operating current of the first light source. In operation S910, it is determined whether the center wavelength of the transmission type shutter and the wavelength of the first light source match each other. If the wavelengths match, the maximum demodulation efficiency may be obtained without further changing of the wavelength difference. Otherwise, in operation S911, it is determined whether the center wavelength of the transmission type shutter is greater than the wavelength of the first light source. In operation S912, if the center wavelength is greater than the wavelength of the first light source, the operating current of the first light source may be increased. Accordingly, in operation S913, the wavelength of the first light source may be increased. Therefore, it is possible to reduce the wavelength difference between the center wavelength of the transmission type shutter and the wavelength of the first light source. If the operating current of the first light source increases, operations S910 to S913 may be repeated until the center wavelength of the transmission type shutter and the wavelength of the first light source match each other. On the other hand, if the center wavelength is less than the wavelength of the first light source, the operating current of the first light source may be reduced in operation S914. Accordingly, it is possible to reduce the wavelength difference as the wavelength of the first light source becomes smaller in operation S915. Similarly, after returning to operation S910, all of the operations may be repeated until the wavelength difference becomes the minimum. A first controller may control the processes.

Referring to FIG. 9B, it is possible to change the wavelength difference by adjusting an operating current of the first light source. In operation S920, it is determined whether the center wavelength of the transmission type shutter and the wavelength of the first light source match each other. If the wavelengths match, maximum demodulation efficiency may be obtained without further changing of the wavelength difference. Otherwise, in operation S921, it is determined whether the center wavelength of the transmission type shutter is greater than the wavelength of the first light source. The term "match" may include not only identically numerical matching but also matching within a certain range of a numerical value. For example, in operation S921, an allowable value with respect to a range in which the center wavelength of the transmission type shutter and the wavelength of the first light source match each other, may be set. In operation S922, if the center wavelength is greater than the wavelength of the first light source, a driving voltage of the transmission type shutter may be lowered. Accordingly, in operation S923, the center wavelength of the transmission type shutter may be reduced. Therefore, it is possible to reduce the wavelength difference between the center wavelength of the transmission type shutter and the wavelength of the first light source. If the driving voltage of the transmission type shutter is lowered, operations S920 to S923 may be repeated until the center wavelength of the transmission type shutter and the wavelength of the first light source match each other. On the other hand, if the center wavelength is less than the wavelength of the first light source, the driving voltage of the transmission type shutter may be increased in operation S924. Accordingly, it is possible to reduce the wavelength difference as the wavelength of the first light source increases in operation S925. Similarly, after returning to operation S920, all of the operations may be repeated until the wavelength difference becomes the minimum.

FIGS. 9A and 9B are described separately with respect to the above operations, however, the operations may be combined. In addition, FIGS. 9A and 9B are not limited to the above-described examples. However, as described above, in the operations described with reference to FIG. 9B, an AC (of FIG. 1C) driving voltage of the transmission type shutter may be maintained in a range which does not influence an operation of the transmission type shutter.

Referring to FIG. 9C, a change in wavelengths of the transmission type shutter and the first light source according to temperature may be determined. The maximum demodulation efficiency may be obtained when the wavelengths of the first light source and the transmission type shutter match each other. Otherwise, a wavelength difference may be adjusted by adjusting at least one of an operating current of the first light source and the AC driving voltage of the transmission type shutter. Wavelengths of the transmission type shutter and the first light source match each other and have a value of 942 nm at 30° C. Therefore, maximum demodulation efficiency may be obtained when the first light source and the transmission type shutter start operating. However, as the temperature of the first light source and the transmission type shutter rise due to heating according to operations thereof, a change in a center wavelength of the transmission type shutter according to temperature is 0.135 nm/° C., and a change in a wavelength of the first light source according to temperature is 0.31 nm/° C. Accordingly, the demodulation efficiency may be reduced as a wavelength difference occurs. Therefore, the wavelength differences may be reduced by adjusting an operating current (or a driving voltage) of at least one of the first light source and the transmission type shutter.

A 3D camera according to exemplary embodiments may include a second light source that is capable of adjusting a wavelength of emitted light. The second light source may be spaced apart from a first light source and a transmission type shutter in order not to be thermally affected by the same. Transmittance of the transmission type shutter may be directly measured via a separate second light source without changing a temperature condition of the first light source and the transmission type shutter in an operating state. Furthermore, distance precision of the 3D camera may be increased by obtaining a center wavelength of the transmission type shutter for which the transmittance of the transmission type shutter may be a maximum and correcting the wavelength difference between the center wavelength of the transmission type shutter and a wavelength of the first light source.

Furthermore, a transmittance-measuring device according to exemplary embodiments may include a first controller controlling the transmission type shutter and the first light source, and a second controller controlling the second light source. As described above, the measuring of the transmittance of the transmission type shutter and the correction of the wavelength difference may be continuously performed by the first and second controllers. Thus, it is possible to continuously correct a wavelength difference which continuously changes according to an operating state, and therefore, demodulation efficiency of the 3D camera may be improved.

It should be understood that the exemplary embodiments described herein should be considered in a descriptive sense only and not for purposes of limitation. Descriptions of the features or aspects within each exemplary embodiment should typically be considered as being available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A three-dimensional (3D) camera comprising:
a first light source configured to emit first light toward an object, the first light being reflected from the object;
a transmission type shutter configured to modulate the reflected first light to generate modulated light;
an image sensor configured to sense the modulated light that passes through the transmission type shutter; and
a second light source that is spaced apart from the first light source, the image sensor, and the transmission type shutter in order to be thermally unaffected by the first light source, the image sensor, and the transmission type shutter , and is configured to emit second light toward the object, and to vary a wavelength of the second light, the varied wavelength of the second light being used by the 3D camera to measure transmittance of the transmission type shutter, and
wherein, when the transmittance of the transmission type shutter is measured via the second light source, the first light is prevented from being incident on the transmission type shutter.

2. The 3D camera of claim 1, further comprising a light blocker provided between the first light source and the object and configured to block the first light when the second light source is emitting the second light toward the object.

3. The 3D camera of claim 1, wherein the second light source is further configured to emit uniform light having uniform intensity.

4. The 3D camera of claim 3, wherein the second light source further comprises:
a light emitter configured to emit light;
an optical fiber configured to transmit the light emitted by the light emitter, wherein one end of the optical fiber is connected to the light emitter;
a light controller configured to adjust an intensity of the light emitted by the light emitter; and a photodiode configured to feed back a part of the light that passed through the optical fiber to the light controller to thereby generate the uniform light.

5. The 3D camera of claim 1, further comprising:
a first controller configured to control the first light source, the image sensor, and the transmission type shutter; and
a second controller configured to control the second light source.

6. The 3D camera of claim 5, wherein the second controller is further configured to control a wavelength and an intensity of the second light emitted by the second light source according to a signal transmitted from the first controller.

7. The 3D camera of claim 5, further comprising a spectrometer configured to measure an intensity of the second light with respect to a wavelength of the second light source and transmit information about the intensity of the second light to the first controller.

8. The 3D camera of claim 1, further comprising a beam splitter configured to align the second light to reach a same position on the object as a position reached by the first light.

9. The 3D camera of claim 1, further comprising a beam expander configured to expand and radiate the second light of the second light source.

10. The 3D camera of claim 1, further comprising a spectrometer configured to measure a wavelength of the first light.

11. The 3D camera of claim 1, wherein the transmission type shutter is one from among a PIN diode type shutter, an electro-optical type shutter configured to use the Pockel effect, and an electro-optical type shutter configured to use the Kerr effect.

12. The 3D camera of claim 1, wherein the first light source is one from among an edge-emitting laser, a vertical-cavity surface emitting laser, and a distributed feedback laser.

13. A transmittance-measuring device of a three-dimensional (3D) camera comprising a transmission type shutter and a light source, the transmittance-measuring device comprising:
a wavelength-variable light source configured to emit light toward directly or indirectly to the transmission type shutter of the 3D camera, and the wavelength-variable light source being spaced apart from the transmission type shutter in order to be thermally unaffected by the transmission type shutter;
a light blocker configured to block light emitted by the light source of the 3D camera from propagating to the transmission type shutter when transmittance of the transmission type shutter is measured based on the light emitted by the wavelength-variable light source; and
a controller configured to control a wavelength of the light and an intensity of the light irradiated by the wavelength-variable light source.

14. The transmittance-measuring device of claim 13, further comprising an optical device configured to adjust a path of the light emitted by the wavelength-variable light source.

15. The transmittance-measuring device of claim 14, wherein the optical device comprises:
an optical fiber configured to transmit the light emitted by the wavelength-variable light source; and
a beam expander located at one end of the optical fiber and configured to expand the emitted light.

16. A method of measuring transmittance of a three-dimensional (3D) camera system comprising a first light source configured to emit first light toward an object; a transmission type shutter configured to modulate the first light reflected from the object to generate modulated light; an image sensor configured to sense the modulated light that passes through the transmission type shutter; and a second light source that is spaced apart from the first light source, the image sensor, and the transmission type shutter in order to be thermally unaffected by the first light source, the image sensor, and the transmission type shutter, and is configured to emit second light toward the object and to vary a wavelength of the second light, the method comprising:
operating the first light source and the transmission type shutter at the same frequency;
blocking the first light emitted by the first light source from propagating to the transmission type shutter when transmittance of the transmission type shutter is measured based on the second light;
emitting the second light to the object so that the second light is reflected from the object to the transmission type shutter; and
measuring an intensity of the second light that passes through the transmission type shutter and reaches the image sensor.

17. The method of claim 16, further comprising:
varying a wavelength of the second light; and
obtaining a center wavelength of the transmission type shutter when the intensity of the second light that passes through the transmission type shutter and reaches the image sensor is a maximum.

18. The method of claim 17, further comprising correcting a difference between the center wavelength of the transmission type shutter and a wavelength of the first light.

19. The method of claim 18, wherein the correcting the difference comprises adjusting an operating current of the first light source and matching the wavelength of the first light with the center wavelength of the transmission type shutter.

20. The method of claim 18, wherein the correcting the difference comprises adjusting a driving voltage of the transmission type shutter and matching the center wavelength of the transmission type shutter with the wavelength of the first light.

21. The method of claim 16, wherein the second light reaches a plurality of parts of the image sensor,
the method further comprising comparing the intensity of the second light that reaches the plurality of parts of the image sensor and measuring uniformity corresponding to a position of the transmission type shutter, from among a plurality of image points of the object, based on the comparing.

* * * * *